(12) United States Patent
Shimakura et al.

(10) Patent No.: US 6,241,830 B1
(45) Date of Patent: Jun. 5, 2001

(54) NON-CHROMIUM ANTICORROSIVE TREATMENT

(75) Inventors: Toshiaki Shimakura; Katsuyoshi Yamasoe, both of Chiba-ken (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/373,580

(22) Filed: Aug. 13, 1999

(30) Foreign Application Priority Data

Aug. 13, 1998 (JP) .................................................. 10-228907

(51) Int. Cl.$^7$ .................................................. C23C 22/00
(52) U.S. Cl. .......................... 148/251; 148/256; 148/259; 148/270; 427/344; 427/419.5; 106/14.12
(58) Field of Search ..................................... 148/255, 256, 148/259, 270, 251, 254, 265; 427/344, 419.5; 106/14.12

(56) References Cited

U.S. PATENT DOCUMENTS

| | | | | |
|---|---|---|---|---|
| 4,457,790 | * | 7/1984 | Lindert et al. | 148/251 |
| 4,555,445 | | 11/1985 | Frey et al. | 428/340 |
| 4,659,394 | * | 4/1987 | Hara et al. | 148/251 |
| 4,748,055 | | 5/1988 | Landers et al. | 427/292 |

FOREIGN PATENT DOCUMENTS

| | | |
|---|---|---|
| 0385806 | 9/1990 | (EP) . |
| 0676250 | 10/1995 | (EP) . |
| 0878519 | 11/1998 | (EP) . |
| 1509258 | 5/1978 | (GB) . |

OTHER PUBLICATIONS

WPI Abstract Accession No. 1991–205206[28] & JP 030131370 A (Kansai Paint), Jun. 1991.
WPI Abstract Accession No. 1997–475531[44] & JP 090221595 A (Kansai Painti), Aug. 1997.
ASM Handbook, Formerly Ninth Edition, Metals Handbook, vol. 13: Corrosion, ASM International Handbook Committee, 1992, p. 378–379. (No Month Data).*

* cited by examiner

Primary Examiner—John Sheehan
Assistant Examiner—Andrew L. Oltmans
(74) Attorney, Agent, or Firm—Wenderoth, Lind & Ponack L.L.P.

(57) ABSTRACT

The present invention relates to an anticorrosive treatment including following steps (1) contacting a metal to be treated with an aqueous solution containing one or more kinds of compounds containing phosphorus ions, (2) washing it if desired, and (3) applying anticorrosive coatings containing one or more kinds of sulfur compounds and a water dispersible silica in a composition containing an aqueous resin and water as main components.

12 Claims, No Drawings

NON-CHROMIUM ANTICORROSIVE TREATMENT

BACKGROUND OF THE INVENTION

The present invention relates to a method for preventing a metal material or steel plated with metal from the formation of white rust, a primary anticorrosion, and a pollution-free anticorrosive treatment as a primer coating without a chromate.

An anticorrosive treatment for zinc or aluminum plated steel sheet or non-plated steel has been researched and actually used for a long time. As conventional anticorrosive coatings chromate-based anticorrosive coatings are exemplified typically in Japanese Patent Application KOKAI No.131370/1991 in which anticorrosive coatings containing aqueous resins and chromate are disclosed. Such chromate-based anticorrosive coatings, however, are restricted in use because of the high toxicity and the carcinogenicity. In addition, the corrosion resistance is insufficient in some cases.

Alternatively, various kinds of chromium-free, so-called non-chromium type anticorrosive coatings have been developed recently. Non-chromium type anticorrosive coatings containing a compound having a carbodiimide bonding, an organo-silicate and silica particles are disclosed in Japanese Patent Application KOKAI No. 221595/1997, which relates to a multi-layer film, and is insufficient in the corrosion resistance as a single layer.

Generally, the non-chromium treatment using non-chromium type anticorrosive coatings has a problem that the adhesion after applying is not always sufficient. When a paint is applied on a chromate film, a strong adhesion is achieved between a chromate film and a topcoat paint film, as a chromium ion in the interface is used for the cross-linking of the paint resin in the chromate treatment. On the contrary, in the case of the non-chromium treatment, such a strong adhesion can be hardly attained.

SUMMARY OF THE INVENTION

The purpose of the present invention is to provide a non-chromium anticorrosive treatment, which is more excellent in anticorrosive property and adhesion of topcoat film, and to provide a metal material or steel plated with metal that is treated an-icorrosively thereby. The present invention is relates to a method of preventing corrosion of a metal material or steel plated with metal, which comprises contacting a metal material or a steel plated with metal with an aqueous solution containing one or more kinds of compounds containing a phosphorus ion (The term "phosphorus ion" means acid ions containing at least one of a phosphorus atom in the present specification), washing the treated sheet if desired, and then applying anticorrosive coatings containing one or more kinds of sulfur compounds and a water dispersible silica in a composition containing aqueous resins and water.

Further, the present invention relates to a metal material or steel plated with metal treated anticorrosively with the method mentioned above.

DETAILED DESCRIPTION OF THE INVENTION

The present invention is relates to a method of preventing corrosion of metal, which comprises contacting a metal material or steel plated with metal with an aqueous solution containing one or more kinds of compounds containing a phosphorus ion, washing the treated sheet with water if desired, and then applying anticorrosive coatings containing one or more kinds of sulfur compounds and a water dispersible silica in a composition containing aqueous resins and water.

In the present specification the term "metal material" includes steel, titanium, aluminum, copper sheet or the like and a metal material plated by galvanizing, fused metal plating and the like. As the steel cold-rolled steel, hot-rolled steel, stainless steel and the like are exemplified.

In the present specification the term "steel plated with metal" means steel which is plated with metal such as Zn, Al, Ni, Cr, Sn, Pb, Fe, Co, Mg, Mn, Ti and the like, or an alloy of the above metals. A metal that is alloyed by a heat treatment after the plating is also included. A small amount of another metal such as Co, Mo, W, Ni, Ti, Cr, Al, Mn, Fe, Mg, Pb, Sb, Sn, Cu, Cd, As and the like as a hetero-metal or an impurity, and/or a metal material in which at least one of inorganic compounds such as silica, alumina, titania and the like are dispersed, or a plating containing any ingredients other than Fe-P. The plating may contain plural layers.

The method of plating may include electro-galvanizing, hot dip-plating, fused metal plating deposition, injection and the like.

The typical examples of the steel plated with metal are zinc-plated steel and aluminum plated steel, on which an excellent anticorrosive effect is achieved by the anticorrosive coatings of the present invention.

When a metal material or steel plated with metal is treated with an aqueous solution comprising compounds containing phosphorus ion such as phosphoric acid ion, condensed phosphoric acid ion, phytic acid ion phosphinic acid ion or phosphonic acid ion, such ions are adsorbed on the zinc plated surface and an amorphous thin film of the compounds containing a phosphorus ion is formed. It is considered that this film not only lowers the oxygen reduction current density so as to improve the anticorrosion property, but also improves the adhesion between the metal and an organic compound film when the organic film is formed thereon when the phosphorus ion exists on the surface of the metal as known in the case of zinc phosphate treatment. Therefore, in the present invention where a metal material or steel plated with metal is pre-treated with an aqueous solution of the compound containing a phosphorus ion and then the resin type anticorrosive coating is applied thereon, the adhesion between the metal material or steel plated with metal and the anticorrosive film is improved, so that the impregnation of corrosion factors such as water or ions into the interface is prevented and the anti-corrosive property improves moreover.

The defect of the adhesion of the top coat which may happen when the top coat is applied on the metal treated with anticorrosive coatings of the present invention is mostly due to the defect of the adhesion between anticorrosive film and zinc plated surface, and the adhesion between the anticorrosive film and the top coat film is good in general. Such defect of the adhesion often happens when a phosphorus ion is removed out of an anticorrosive coatings. On the other hand, when the phosphorus ion exists in anticorrosive coatings, particularly when a water dispersible silica is additionally used, the anticorrosive coatings are apt to gel and the storage stability becomes deteriorated. Thus, the presence of a phosphorus ion will be often inconvenient.

In the present invention a metal material or steel plated with metal is pre-treated with aqueous solution containing the phosphorus ion, a conversion film is formed by said ion on its surface, and then anticorrosive coating not containing a phosphorus ion is applied. Therefore, the adhesion between the anticorrosive film and the zinc plated surface increases and the adhesion of the topcoat increases as well as the storage stability of the anticorrosive coatings is improved.

According to the present invention the anticorrosive effect is achieved by the adsorption of a sulfur atom of sulfur compounds selected from sulfides, sulfur powder, triazinethiol compounds, thiocarbonyl group-containing compounds, thiosulfuric acid, thiosulfates, persulfuric acid, persulfates, and sulfur oxides in the anticorrosive coatings on the surface of zinc plated steel treated with the compounds containing phosphorus ion. Further, though its reason is not sure, when compounds containing a phosphorus ion exist on the zinc plated surface, the adsorption of the sulfur atom is promoted. In addition, this effect is increased by the pre-treatment of a metal material or steel plated with metal with the aqueous solution of the compounds containing a phosphorus ion acid.

In the present invention, examples of the compounds which can generate the phosphorus ion in water include phosphoric acid; phosphates represented by $Na_3PO_4$, $Na_2HPO_4$, $NaH_2PO_4$; condensed phosphoric acids, for example polyphosphoric acids, metaphosphoric acid, pyrophosphoric acid, ultraphosphoric acid, or their salts; phytic acid or its salts; phosphinic acid or its salts; phosphonic acid or its salts.

On the pre-treatment of a metal material or steel plated with metal, the concentration of the phosphorus ion is adjusted to 0.1–200 g/l, preferably 0.5–100 g/l, more preferably 1.0–75 g/l in the aqueous solution. When the concentration of the compound in the aqueous solution is less than 0.1 g/l, the effect of the pre-treatment is insufficient and anticorrosive property or adhesion lowers. When the concentration of the compound in the aqueous solution is more than 200 g/l, the metal material or steel plated with metal is over-etched and its property lowers.

The pre-treatment of a metal material or steel plated with metal with the aqueous solution of compound containing phosphorus ion may be carried out by any methods such as dipping, spraying, flow coating, bar coating, roll coating and the like so far as the surface of the zinc plated steel to be treated can be contacted with the solution. But after pre-treatment, excessive ions or impurities should be removed from the surface of the metal material or steel plated with metal by washing using pure water like deionized water. Drying or not drying after washing does not influence the properties of the product thereafter, but the drying process is preferable to make the application of anticorrosive coatings easy.

The anticorrosive coatings according to the present invention comprises 1–80 parts by weight, more preferably 5–50 parts by weight of an aqueous resin (the term "aqueous resin" includes a water soluble resin and a water dispersible resin), 99–20 parts by weight, more preferably 95–50 parts by weight of water as a basic formulation; and additionally 0.1–20 g, preferably 0.5–15 g, particularly preferably 1.0–10 g of one or more kinds of sulfur compounds selected from a group consisting of sulfides, sulfur powder, triazinethiol compounds, thiocarbonyl group-containing compounds, thiosulfuric acid, thiosulfates, persulfuric acid, persulfates and sulfur oxides, and 10–500 g, preferably 15–250 g, particularly preferably 20–100 g of water dispersible silica in one liter of the anticorrosive coatings.

Anticorrosive coatings of the present invention comprises an aqueous resin. In the present invention, the aqueous resin refers to not only a water-soluble resin but also the resin finely dispersed in the form of an aqueous emulsion or an aqueous suspension of inherently water-insoluble resins. The examples of the aqueous resin include polyolefin resins, polyurethane resins, acrylic resins, polycarbonate resins, epoxy resins, polyester resins, alkyd resins, phenol resins, and other heat curable resins, and cross-linkable resins are more preferable. Particularly preferable resins are polyolefin resins, polyurethane resins and mixture thereof. Two or more kinds of aqueous resins may be used as a mixture.

Examples of the sulfur compounds useful in the present invention include sulfides, sulfur powders, triazinethiol compounds, thiocarbonyl group-containing compounds, thiosulfuric acid, thiosulfates, persulfuric acid, and persulfates. The most preferable compounds are thiocarbonyl group-containing compounds, which have no or little smell.

Examples of the sulfides include sodium sulfide, ammonium sulfide, manganese sulfide, molybdenum sulfide, iron sulfide, barium sulfide and like.

The example of triazinethiol compounds includes 2,4,6-trimercapto-S-triazine, 2-dibutylamino-4,6-dimercapto-S-triazine, monosodium 2,4,6-trimercapto-S-triazine, trisodium 2,4,6-trimercapto-S-triazine, 2-anilino-4,6-dimercapto-S-triazine, nonosodium 2-anilino-4,6-dimercapto-S-triazine.

Examples of the thiocarbonyl group-containing compounds include thiourea, dimethylthiourea, 1,3-diethylthiourea, dipropylthiourea, dibutylthiourea, 1,3-diphenyl-2-thiourea, 2,2-ditolylthiourea, thioacetamide, sodium dimethyldithiocarbamate, tetramethylthiuram monosulfide, tetrabutylthiuram disulfide, zinc N-ethyl-N-phenyl-dithiocarbamate, zinc dimethylthiocarbamate, piperidine pentamethylenedithiocarbamate, zinc diethyldithiocarbamate, sodium diethyldithiocarbamate, zinc isopropylxanthate, ethylene thiourea, dimethylxanthatedisulfide, dithiooxamide and like. They should only be compounds having at least one thiocarbonyl group.

Examples of thiosulfuric acid and thiosulfates include ammonium thiosulfate, sodium thiosulfate, potassium thiosulfate and the like. Examples of the persulfuric acid and persulfates include ammonium persulfate, sodium persulfate, potassium persulfate, and the like.

In the present invention, one or more kinds of the above sulfur-containing compounds are contained in the anticorrosive coatings of the present invention.

Thiourea derivatives, ammonium thiosulfate and triazinethiols among them are particularly preferable.

By adding water-dispersible silica to anticorrosive coatings of the present invention, the drying ability, antiabrasive property and adhesion of the coating film can be improved. A water dispersible silica aforementioned is not particularly restricted so far as it contains little amount of impurities such as sodium and the like and ones of weak alkalinity. Commercially available silica gels such as "Snowtex N" manufactured by Nissan Kagaku Kogyo K.K., "Adelite AT-20N" manufactured by Asahi Denka Kogyo K.K. and the like or commercially available Aerosil powder, silica particles and the like are usable. When the content of the water dispersible silica is less than 10 g/l, satisfied anticorrosive effect may not be obtained, and when it is more than 500 g/l, the anticorrosive property will not be improved.

Anticorrosive coatings according to the present invention may further contain other components. For example, pigments, surfactants and like may be incorporated. Silane coupling agents may be added to improve the affinity of the aqueous resins with the silica particles and pigments, and to improve the adhesion of the aqueous resins with the zinc or iron phosphate layer.

Such pigments include various kinds of color pigments, for example, inorganic pigments such as titanium oxide ($TiO_2$), zinc oxide (ZnO), zirconium oxide (ZrO), calcium carbonate ($CaCO_3$), barium sulfate ($BaSO_4$), alumina ($Al_2O_3$), kaolin clay, carbon black, iron oxides ($Fe_2O_3$, $Fe_3O_4$) and the like, as well as organic pigments.

Silane coupling agents as aforementioned may be, for example, γ-aminopropyltrimethoxysilane, γ-aminopropyltriethoxysilane, γ-glycidoxypropyltrimethoxysilane, γ-methacryloxypropyltriethoxysilane, N-[2-(vinylbenzylamino)ethyl]-3-aminopropyltrimethoxysilane and the like.

Anticorrosive coatings according to the present invention may contain a solvent; for the purpose of improving the film forming ability of an aqueous resin and forming a more uniform and smooth film. Such solvent is not particularly restricted and any kinds of solvents which are generally used for paints, such as alcohols, ketones, esters, ethers and the like may be used.

According to the present invention, the anticorrosive coatings aforementioned may be used as anticorrosive coatings for a metal or steel plated with metal to perform the anticorrosive treatment thereof. Such anticorrosive treatment may be accomplished by heating and drying the coated article with hot air after applying the anticorrosive coatings according to the present invention on the article to be coated or in an alternative process, by heating in advance an article to be coated followed by applying the anticorrosive coatings on the hot article and then drying it by the residual heat in the article.

The above heating temperature may be 50° C. to 250° C. in any process described above. When the heating temperature is lower than 50° C., the evaporation speed of water is too slow to achieve sufficient film formation, so that sufficient anticorrosion cannot be obtained. On the other hand, when higher than 250° C., the heat decomposition of the aqueous resins and the like occurs so as to deteriorate the treated articles in the SST property and water resistance, and to often change the appearance to yellowish color. Therefore, preferable heating temperature is in the above range, more preferably within 70° C. to 100° C. In the process where an article is heated with hot air after application of the coatings and dried, the drying period is preferably 1 sec to 5 minutes.

In the anticorrosive treatment described above, the thickness of the coated film of the anticorrosive coatings of the present invention is preferably not less than 0.1 μm after drying. A thickness less than 0.1 μm causes deficiency in the anticorrosion ability. On the other hand an excess thickness of the film is economically disadvantageous as an undercoating and inconvenient for the application. Accordingly, a film thickness of 0.1 to 20 μm is more preferable, and 0.1 to 10 μm thickness is most preferable.

Besides, when the anticorrosive coatings of the present invention is used as aqueous anticorrosive coatings, a thickness of 0.1 μm or more may be acceptable.

In the anticorrosive treatment according to the present invention the method for applying the anticorrosive coatings is not particularly restricted, and the usual process such as roll coating, air spraying, airless spraying, dipping and the like may be used.

Typical metal or steel plated with metal to be coated with anticorrosive coatings according to the present invention is zinc-coated steel, aluminum-coated steel or non-coated steel as described above.

The Examples and Comparative Examples illustrate the present invention, but it should not be construed that the present invention is restricted by these examples.

In the examples, the corrosion resistance was evaluated by methods described below.

[Method for Evaluation]

a) Saltwater resistance (Salt spray test: SST):

A 5% aqueous solution of sodium chloride was sprayed on the surface of the test samples and kept at 35° C. for 360 hours. The rust generated was evaluated by 10 grades. The evaluation criteria are as follows.
10: No rust
9: The rust is less than 10%
8: The rust is not less than 10% to less than 20%
7: The rust is not less than 20% to less than 30%
6: The rust is not less than 30% to less than 40%
5: The rust is not less than 40% to less than 50%
4: The rust is not less than 50% to less than 60%
3: The rust is not less than 60% to less than 70%
2: The rust is not less than 70% to less than 80%
1: The rust is not less than 80% to less than 90%
0: The rust is not less than 90%.

b) Adhesion of anticorrosive coatings:

A test piece, which has been coated with anticorrosive coatings, is extruded 8 mm by Ericssen. The extruded part is subjected to a tape-peeling test and then was colored by dipping in a methylene blue solution. As the part where the anticorrosive coatings are stripped is not colored with the methylene blue, the degree of stripping of the anticorrosive coatings can be observed.

The evaluation criteria are as follows.
10: No stripped
9: The degree of stripping is less than 10%
8: The degree of stripping is not less than 10% to less than 20%
7: The degree of stripping is not less than 20% to less than 30%
6: The degree of stripping is not less than 30% to less than 40%
5: The degree of stripping is not less than 40% to less than 50%
4: The degree of stripping is not less than 50% to less than 60%
3: The degree of stripping is not less than 60% to less than 70%
2: The degree of stripping is not less than 70% to less than 80%
1: The degree of stripping is not less than 80% to less than 90%
0: The degree of stripping is not less than 90%.

c) The paint adhesion:

After the anticorrosive coatings are applied on the test piece, acryl type paint "SUPERLAQ 110" (manufactured by NIPPON PAINT CO., LTD.) is coated thereon by a bar coater #30 and dried at 150° C. for 20 minutes.

i) primary adhesive test:

After the acryl type paint is coated, the coated film is cut into lattice (1 mm square×100), and the latticed part is extruded 7 mm by the Ericssen. The extruded part is subjected to a tape-peeling test.

ii) Secondary adhesive test:

After the acryl type paint is coated, the test piece is dipped in boiling water for 30 minutes, and the dipped film is cut into lattice (1 mm square×100). The latticed part is extruded 7 mm by the Ericssen. The extruded part is subjected to a tape-peeling test.

The evaluation criteria for the primary and the secondary adhesive test are as follows.

10: No stripped
9: The stripping ratio of the lattice is less than 10%
8: The stripping ratio of the lattice is not less than 10% to less than 20%
7: The stripping ratio of the lattice is not less than 20% to less than 30%
6: The stripping ratio of the lattice is not less than 30% to less than 40%
5: The stripping ratio of the lattice is not less than 40% to less than 50%
4: The stripping ratio of the lattice is not less than 50% to less than 60%
3: The stripping ratio of the lattice is not less than 60% to less than 70%
2: The stripping ratio of the lattice is not less than 70% to less than 80%
1: The stripping ratio of the lattice is not less than 80% to less than 90%
0: The stripping ratio of the lattice is not less than 90%.
  d) Storage stability of anticorrosive coatings
  The change of the viscosity of the anticorrosive coatings is observed after three months storage at 40° C.
○: a substantial increase of the viscosity is not increased,
×: a substantial increase of the viscosity is observed.

EXAMPLE 1

Commercially available electro-zinc-plated steel sheet "EG-MO" (70×150×0.8 mm) was degreased by spraying an alkali cleaner "Surfcleaner 53S" (manufactured by NIPPON PAINT CO., LTD.) at 60° C. for 2 minutes and washed by water. Then, the steel was dipped in the aqueous solution of phosphoric acid containing 5% by weight of phosphoric acid ion, washed with water, and then washed with pure water, followed by drying at 80° C.

A pure water was mixed with a polyolefin resin "Hightech S-7024" (manufactured by TOHO CHEMICAL INDUSTRY CO., LTD) and polyurethane resin "Bonthighter HUX-320" (manufactured by ASAHI DENKA KOGYO Ltd.) in the weight ratio of 1:1 to obtain the total corcentration of the resin solid of 20% by weight, and then thiourea and water dispersible silica "Snowtex N" (manufactured by NISSAN CHEMICAL INDUSTRY LTD.) were added in the concentration of 5 g/l and 300 g/l, respectively. The mixture was agitated for 30 minutes using Disper and was adjusted to pH 8.4. The anticorrosive coatings obtained were applied on zinc plated steel sheet treated as described above by a #3 bar coater. The coated steel sheet was dried at metal surface temperature of 150° C. to obtain an anticorrosive treated zinc plated steel sheet with dried film thickness of 1 μm.

The salt spray resistance, the adhesion of the anticorrosive coating film and the adhesion of the top-coated paint film of these anticorrosive treated steel sheet and the storage stability of the anticorrosion coatings were evaluated according to the method described above, and the results were shown in Table 1.

EXAMPLES 2–8

The commercially available electro-zinc plated steel sheet (EG-MO, 70×150×0.8 mm) was treated according to the Example 1 except for using an aqueous solution of the compounds containing phosphorus ion in the given amount and kinds shown in Table 1 instead of the aqueous solution of phosphoric acid to give a pre-treated steel sheet.

The obtained pre-treated steel sheet was coated with anticorrosive coatings, which were prepared similarly in Example 1 except for using aqueous resins, sulfur compounds, and water-dispersible silica "Snowtex N" in the amount and kinds as described in Table 1, so that the thickness of dry film of the anticorrosive coatings was 1 μm similarly in Example 1.

The anticorrosively treated steel sheet and anticorrosive coatings obtained were evaluated similarly in Example 1 and the results are shown in Table 1.

COMPARATIVE EXAMPLE 1

The commercially available electro-zinc plated steel sheet (EG-MO, 70×150×0.8 mm) was degreased, washed with water, and coated with the anticorrosive coatings as shown in Table 1 according to Example 1 except for omitting the pre-treatment by the aqueous solution of compounds containing phosphorus ion to give an anticorrosively treated steel sheet. The anticorrosive coatings were coated to the dry-thickness of 1 μm.

The anticorrosive coatings were prepared similarly as in Example 1 except for containing 20% by weight of polyolefin resin "Hightech S-7024" alone as an aqueous resin.

COMPARATIVE EXAMPLE 2

An anticorrosively treated steel sheet was prepared similarly in Example 1 except that an aqueous solution containing a phosphoric acid (0.05 g/l as phosphate ion) was used for pre-treatment and the same anticorrosive coatings as prepared in Comparative Example 1 were used.

COMPARATIVE EXAMPLE 3

An anticorrosively treated steel sheet was prepared according Example 1 except for omitting the pre-treatment of an electro-zinc plated steel sheet with an aqueous solution of the compounds containing phosphorus ion and coating the steel sheet with anticorrosive coatings with dry thickness of 1 μm. Said anticorrosive coatings comprise 20% by weight of an olefin-based resin "Hightech S-7024", phosphoric acid (2.5 g/l as phosphoric ion), 5 g/l of thiosulfuric acid and 500 g/l of "Snowtex N".

COMPARATIVE EXAMPLE 4

An anticorrosively treated steel sheet was prepared similarly in Example 1 except that an aqueous solution containing phosphoric acid (250 g/l of phosphoric ion) was used for a pre-treatment.

Anticorrosively treated steel sheets obtained in Comparative Examples 1–4 were evaluated as in Example and the results were shown in Table 2.

TABLE 1

| | pre-treating agent | | anticorrosive coatings | | | |
|---|---|---|---|---|---|---|
| | | | water | | sulfur comp. | silica |
| No | phosphorus compound | conc. g/l*2 | soluble resin | | name | g/l | g/l |
| Examples | | | | | | |
| 1 | phosphoric acid | 5 | olefin type/urethan type (1/1) | thiourea | 5 | 300 |
| 2 | phytic acid | 0.2 | olefin type | thiosulfuric acid | 5 | 500 |
| 3 | phosphoric | 100 | olefin | triazine- | 0.2 | 20 |

TABLE 1-continued

| No | pre-treating agent phosphorus compound | conc. g/l*² | anticorrosive coatings water soluble resin | sulfur comp. name | g/l | silica g/l |
|---|---|---|---|---|---|---|
|  | acid |  | type/urethane type (1/1) | thiol |  |  |
| 4 | polyphosphoric acid | 5 | epoxy type | diethyl thiourea | 5 | 300 |
| 5 | phosphonic acid | 50 | olefin type/acryl type (1/1) | sulfur powder | 20 | 300 |
| 6 | phosphoric acid | 5 | polyester type | thiourea | 5 | 300 |
| 7 | ammonium phosphate | 5 | polycarbonate type | thiourea | 5 | 300 |
| 8 | sodium phytate | 10 | olefin type | thiourea | 5 | 500 |
| Comparative |  |  |  |  |  |  |
| 1 | non-treatment | — | olefin type | thiourea | 5 | 300 |
| 2 | phosphoric acid | 0.05 | olefin type | thiourea | 5 | 300 |
| 3 | non-treatment | — | olefin type + phosphoric acid 2.5 g/l | thiourea | 5 | 500 |
| 4 | phosphoric acid | 250 | olefin type/urethane type (1/1) | thiourea | 5 | 300 |

*¹phosphorous-containing compound as a source of phosphorous ion
*²concentration of phosphorous ion

TABLE 2

| | evaluation results | | | | |
|---|---|---|---|---|---|
| | | adhesion of | paint adhesion | | |
| No | SST | anticorrosive coatings | primary adhesion | secondary adhesion | storage stability |
| Examples | | | | | |
| 1 | 10 | 10 | 10 | 10 | ○ |
| 2 | 10 | 10 | 10 | 10 | ○ |
| 3 | 9 | 10 | 10 | 10 | ○ |
| 4 | 10 | 10 | 10 | 10 | ○ |
| 5 | 10 | 10 | 10 | 10 | ○ |
| 6 | 10 | 10 | 10 | 10 | ○ |
| 7 | 10 | 10 | 10 | 10 | ○ |
| 8 | 10 | 10 | 10 | 10 | ○ |
| Comp. Example | | | | | |
| 1 | 3 | 4 | 1 | 1 | |
| 2 | 4 | 4 | 3 | 2 | |
| 3 | 6 | 8 | 8 | 6 | |
| 4 | 6 | 6 | 6 | 6 | |

The commercially available aqueous resins use in Examples and Comparative Examples are as follows:
Polyolefin resin:
"Hitech S-7024": manufactured by TOHO Kagaku K.K. (Examples 1, 2, 8 and Comparative Examples 1, 2)
"PC-2200": manufactured by SHOEI kagaku K.K. (Examples 3, 5 and Comparative Examples 3, 4)
Polyurethane resin:
"Bonthighter HUX-320" manufactured by ASAHI DENKA KOGYO K.K.
Acrylic resin:
"EM-1220" manufactured by NIPPON PAINT Co., LTD.
Epoxy resin:
"Polysol 8500" manufactured by SHOWA KOBUNSHI K.K.
Polyester resin:
"Pesresin A-124G" manufactured by TAKAMATSU YUSHI K.K.
Polycarbonate resin:
"Superflex" manufactured by DAIICHI KOGYOU SEIYAKU K.K.

As apparent from the above results an excellent corrosion resistance and adhesion of the painted film can be achieved by the pre-treatment of zinc plated steel sheet with an aqueous solution of the compounds containing phosphorus ion before applying the anticorrosive coatings comprising an aqueous resin, a sulfur-containing compound, and a water dispersible silica.

In addition, as the anticorrosive coatings do not contain any phosphor compound, storage stability thereof can be improved.

What is claimed is:

1. An anticorrosive treatment which comprises contacting a metal material or steel plated with metal with an aqueous solution containing one or more compounds containing phosphorus ions, washing it with water if desired, and then applying an anticorrosive coating containing one or more sulfur compounds and a water dispersible silica in a composition containing an aqueous resin selected from polyolefin resins, polyurethane resins and mixtures thereof and water as main components.

2. An anticorrosive treatment of claim 1, in which the metal material or steel plated with metal is zinc-plated steel sheet, aluminum-plate(d steel sheet or non-plated steel.

3. An anticorrosive treatment of claim 1, in which the phosphorus ions are selected from the group consisting of phosphate ion, condensed phosphate ion, phytate, phosphinate ion and phosphonate ion.

4. An anticorrosive treatment of claim 1, in which the concentration of compounds containing phosphorus ions in the aqueous solution is 0.1 to 200 g of phosphorus ions/liter of aqueous solution.

5. An anticorrosive treatment of claim 1, in which the concentration of compounds containing phosphorus ions in the aqueous solution is 0.5 to 100 g of phosphorus ions/liter of aqueous solution.

6. An anticorrosive treatment of claim 1, in which the sulfur compounds are selected from the group consisting of sulfides, sulfur powder, triazinethiol compounds, thiocarbonyl group-containing compounds, thiosulfuric acid, thiosulfates, persulfuric acid, persulfates and sulfur oxides.

7. An anticorrosive treatment of claim 1, in which the concentration of sulfur compounds in the anticorrosive coating is 0.1 to 20 g of sulfur compounds/liter of anticorrosive coating.

8. An anticorrosive treatment of claim 1, in which the concentration of the water dispersible silica in the anticorrosive coating is 10 to 500 g of water dispersible silicaaiter of anticorrosive coating.

9. An anticorrosive treatment of claim 1, in which the concentration of the water dispersible silica in the anticorrosive coating is 15 to 250 g of water dispersible silica/liter of anticorrosive coating.

10. An anticorrosive treatment of claim 1, in which the ratio of the aqueous resin and water in the anticorrosive coating is 1–80 parts by weight of the resin and 99–20 parts by weight of water.

11. An anticorrosive treatment of claim 1, in which the ratio of the aqueous resin and water in the anticorrosive coating is 5–50 parts by weight of the resin and 95–50 parts by weight of water.

12. An anticorrosive treatment of claim 1, in which the anticorrosive coating is coated in a thickness of 0.1 to 20 $\mu$m as a dry film.

* * * * *